(12) United States Patent
Tshishiku

(10) Patent No.: US 7,992,437 B2
(45) Date of Patent: Aug. 9, 2011

(54) LIQUID LEVEL DETECTOR

(75) Inventor: Eugene M. Tshishiku, Augusta, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 459 days.

(21) Appl. No.: 11/354,692

(22) Filed: Feb. 14, 2006

(65) Prior Publication Data

US 2007/0234796 A1  Oct. 11, 2007

(51) Int. Cl.
*G10D 11/24* (2006.01)
*G01F 23/26* (2006.01)

(52) U.S. Cl. ..... 73/431; 73/290 B; 73/290 R; 73/304 C; 73/304 R; 73/866.5

(58) Field of Classification Search .......... 73/46, 290 R, 73/304 C, 304 R, 290 B, 866.5, 431; 340/608, 340/618, 620; 324/655, 670
See application file for complete search history.

(56) References Cited

U.S. PATENT DOCUMENTS

| | | | | |
|---|---|---|---|---|
| 2,229,036 A | * | 1/1941 | Bird et al. | 429/8 |
| 2,904,751 A | * | 9/1959 | Parsons | 324/663 |
| 3,214,655 A | | 10/1965 | DiGiacomo | |
| 3,360,991 A | * | 1/1968 | Hoss et al. | 73/304 R |
| 3,391,547 A | | 7/1968 | Kingston | |
| 3,398,578 A | * | 8/1968 | Dozer | 73/304 R |
| 4,027,534 A | * | 6/1977 | Zimmermann | 73/304 R |
| 4,056,978 A | * | 11/1977 | Zimmermann | 73/304 R |
| 4,170,048 A | | 10/1979 | Anthony | |
| 4,196,624 A | * | 4/1980 | Willenbrock et al. | 73/304 R |
| 4,383,544 A | * | 5/1983 | Vosper | 137/94 |
| 4,392,128 A | * | 7/1983 | Young et al. | 340/616 |
| 4,465,088 A | * | 8/1984 | Vosper | 137/1 |
| 4,523,465 A | * | 6/1985 | Fasching et al. | 367/81 |
| 4,717,045 A | * | 1/1988 | Coppola | 222/64 |
| 4,878,043 A | | 10/1989 | Heusquin et al. | |
| 4,879,902 A | * | 11/1989 | Loniello | 73/304 R |
| 5,031,452 A | * | 7/1991 | Dobson et al. | 73/304 R |
| 5,057,813 A | | 10/1991 | Sasaki et al. | |
| 5,109,218 A | * | 4/1992 | Inglima | 340/605 |
| 5,186,263 A | * | 2/1993 | Kejr et al. | 175/20 |
| 5,400,651 A | * | 3/1995 | Welch | 73/290 R |
| 5,785,425 A | * | 7/1998 | Buchanan | 374/16 |
| 5,943,908 A | * | 8/1999 | Innes et al. | 73/290 R |
| 5,992,231 A | * | 11/1999 | Mulder et al. | 73/304 C |
| 6,578,415 B2 | | 6/2003 | Schimmel et al. | |
| 6,938,478 B2 | * | 9/2005 | Arias | 73/304 R |
| 6,938,479 B2 | * | 9/2005 | Carpenter et al. | 73/304 C |
| 7,337,662 B2 | * | 3/2008 | Sato et al. | 73/304 C |

FOREIGN PATENT DOCUMENTS

GB  2136965 A  9/1984

* cited by examiner

Primary Examiner — David A. Rogers
(74) Attorney, Agent, or Firm — J. Bennett Mullinax, LLC

(57) ABSTRACT

A liquid level detector for conductive liquids for vertical installation in a tank, the detector having a probe positioned within a sheath and insulated therefrom by a seal so that the tip of the probe extends proximate to but not below the lower end of the sheath, the lower end terminating in a rim that is provided with notches, said lower end being tapered, the taper and notches preventing debris collection and bubble formation, said lower end when contacting liquid as it rises will form an airtight cavity defined by the liquid, the interior sheath wall, and the seal, the compression of air in the cavity preventing liquid from further entry into the sheath and contact with the seal. As a result, the liquid cannot deposit a film to form an electrical bridge across the seal.

6 Claims, 2 Drawing Sheets

LIQUID LEVEL DETECTOR

CONTRACTUAL ORIGIN OF THE INVENTION

The United States Government has rights in this invention pursuant to Contract No. DE-AC09-96SR18500 between the U.S. Department of Energy and Washington Savannah River Company.

FIELD OF THE INVENTION

This invention relates to a liquid level detector having a conductivity probe for use in containers to identify the fill limit and to detect a decrease in liquid level that may indicate a leak.

BACKGROUND OF THE INVENTION

Presently existing liquid level detectors having conductivity probe sensors have not always operated with satisfactory effectiveness and occasionally have provided false readings. In a typical installation, a probe is suspended at the end of an electric conductor which is connected to a sensor. Another conductor connects the sensor to a metal tank filled with a conductive liquid. When the probe comes in contact with the conductive liquid, an electric circuit is completed and the sensor relay opens to actuate an alarm. In this manner the level of the liquid in a tank may be detected.

In one prior art publication, namely, U.S. Pat. No. 4,717,045 to Peter J. Coppola, a method for detecting the level of sugar syrup is described in which a conductivity probe is suspended above the syrup in a housing with the tip of the probe extending downwardly in contact with the syrup. A sensor is connected to the probe and housing so that a complete circuit is made with the probe, syrup, housing wall, and sensor. When the syrup level drops, the circuit is broken and the sensor reacts to increase the fill level. In this position, syrup on the probe drips quickly and freely so there is no syrup clinging to the probe to produce a false signal after the syrup level has dropped. However, if the syrup level were to rise and completely submerge the probe and adjacent housing wall, a residual film of syrup could act as a conductive path even after the syrup level has dropped below the tip of the probe thereby defeating the purpose of the syrup level detector. Accordingly, it is one object of the present invention to provide a probe and detector arrangement whereby a conductive film or residue will not be present to prevent proper liquid level detection.

It has also been discovered in other probes for use with conductive liquid where the insulation surrounding the probe comes in contact with the conductive liquid that is not sticky like syrup, that a residual conductive film will often be left on the insulation thereby causing bridging that produces false signals. Accordingly, it is another object of the present invention to provide a liquid level detector that avoids the formation of a conductive, bridging film.

The foregoing and other objects are achieved by the present invention which is described below.

SUMMARY OF THE INVENTION

In one aspect, the present invention is a liquid level detector for use in enclosed containers of electrically conductive liquids comprising a sheath or housing having an open lower end defined by a rim for contacting a liquid; an electrically conductive probe positioned within said sheath, said probe being spaced apart from the sheath; said probe having a tip extending proximate to but not beyond the open end of said sheath; an insulating seal between said probe and said sheath, said seal being spaced apart from and above said open end of the sheath, said seal closing the sheath to form an airtight chamber when liquid contacts and closes the open end of said sheath; and said rim having at least one passageway preventing debris collection and bubble formation in said chamber whereby air trapped in the chamber as liquid rises or as the probe is lowered and comes in contact therewith prevents any liquid from contacting said seal thereby preventing the formation of a conductive path between the probe and sheath. Preferably a plurality of notches uniform in height are disposed around said rim. The lower outer wall of the housing is tapered inwardly in the area immediately adjacent said rim.

In another aspect, the present invention is a method of detecting the level of a liquid using a liquid level detector having an electrically conductive probe positioned within a sheath and being insulated therefrom, said detector being for use within a container of electrically conductive liquid wherein the method comprises maintaining electrical isolation between the probe and sheath comprising the steps of positioning an electrically conducted probe within a sheath with an insulating material securing said probe within the sheath, said insulating sealing the sheath in an airtight manner, said insulating seal being spaced apart from the lower end of said sheath; positioning the detector in a container at the desired fill level of the container; introducing liquid to the container and as the liquid rises and contacts the rim of said sheath, air is trapped within the sheath to form an airtight cavity defined by the seal, the liquid, and the sheath wall. In this position the probe can contact the liquid but the liquid is prevented from upward movement or rising any further within the sheath because of the resistance of the air pressure in the trapped air cavity. Thus, no liquid contacts the seal area so that no film can be deposited and there is no bridging of the insulated area and the probe remains isolated and insulated. The trapped air continues to protect the insulation of the probe even as the liquid rises. In the position where the probe contacts the liquid, a sensor will actuate an alarm so that an operator will know that the fill level has been reached. When the container level drops, the probe remains isolated from the container wall as no film has been deposited.

In like manner, when the tip of the probe is in contact with a liquid and the circuit is closed, a drop in liquid level opens the circuit so that leakage may be detected.

BRIEF DESCRIPTION OF THE DRAWINGS

Numerous other objects, features and advantages of the invention should now be apparent upon reading the following detailed description taken in conjunction with the accompanying drawings in which.

It is understood that the foregoing figures are presented by way of illustration of the invention and are limiting on the scope thereof.

DETAILED DESCRIPTION

Liquid level detectors that employ conductivity probes are often used in waste tanks to protect the tank fill limit and they are also found in similar liquid reservoirs to detect leaks. In a typical prior art installation, the probe is suspended at the end of an electric conductor or electrode which is connected to a sensor. The sensor is also in electrical contact with a conductive liquid. When the probe comes in contact with the liquid, an electric circuit is completed and the sensing module or sensor relay actuates an alarm for an operator.

A particularly critical waste is one that contains radioactive material. Obviously, overfilling and leakage are vital concerns. In testing one prior art detector for a tank of radioactive liquid it was discovered that the fiberglass electrical insulator that surrounded the electrode was bridged by a film of radioactive waste because once the insulation and probe had contacted the radioactive waste and receded, the waste had left a residue of a continuous conductive film on the probe, insulation, and detector assembly. To overcome this problem, a surprisingly new design has been developed using air trapped in the detector housing to prevent the formation of a continuous film thereby eliminating false signals.

Figure 1:
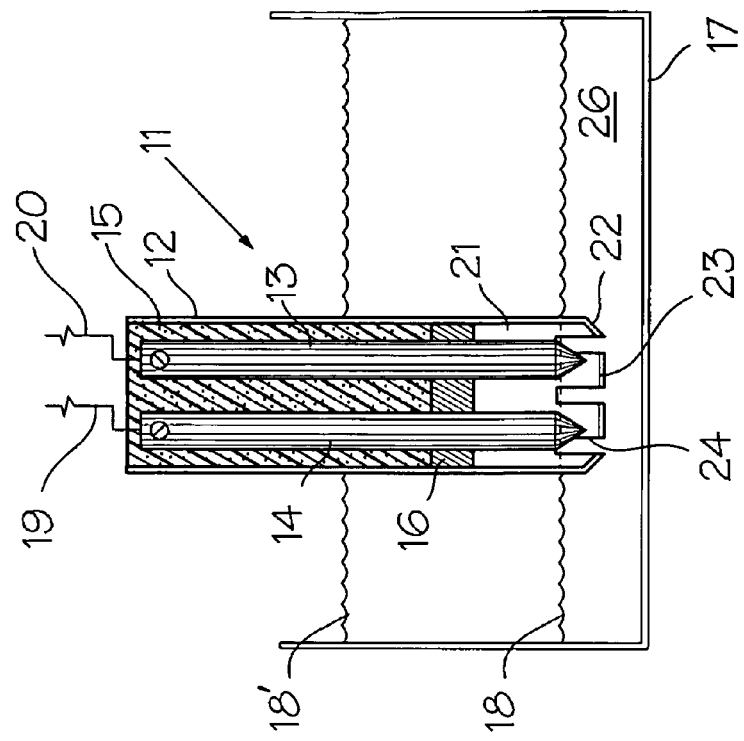
FIG. 1 is a schematic elevation view of a detector with a single electrode position within a metallic tank.

Turning now to FIG. 1 for a better understanding of the invention, a schematic representation of an elevation or side view in partial section of a preferred embodiment of the liquid level detector 1 is shown suspended in liquid 26 which is contained in metal tank or container 6. The tank in this instance does not have to be solid metal but can be a metal lined tank. Any metal member that is contacted by the liquid 26 in the tank may be used so that a conductive path may be established between the liquid 26 and detector 1.

As shown in FIG. 1, liquid level detector 1 is suspended in the liquid 26 in the tank 6 and two levels of liquid, level 7 and 7' are shown. Liquid level 7 represents the level of liquid both inside and outside the sheath 12 in the first instance and the liquid inside the sheath remains at level 7 even though outside the sheath the liquid may rise to level 7'. The detector 1 comprises a central electrode 3 positioned within sheath or housing 12 which may be in tubular or similar form. The probe or central electrode 3 is held in position by a non-conductive or insulating collar 5 which also can act as a hermetic seal between the probe 3 and the sheath wall so that air below the collar 5 in cavity 8 cannot escape through either the collar or the sheath wall. The space 4 above the collar is preferably filled with an epoxy or similar material for electrical insulation and also to further insure air tightness of the seal. At its upper end the electrode or probe 3 is connected to a wire or similar electrical conductor or connector 9. Likewise, a connector or wire 10 is connected to the tank wall 6 in the case of a metal tank. These two leads or connecting members 9 and 10 connect to a sensing module or sensor which is not shown but is of the type of sensors or relays which are well-known to those skilled in the art of designing devices that sense a circuit break and actuate an alarm.

At the lower end of the detector 1 the probe 3 extends through the cavity 8 with its pointed tip positioned proximate to but not extending beyond the rim 23 of the sheath. This rim defines the lower edge of the sheath and the sheath wall slopes inwardly as it approaches the rim and has a tapered surface 22 at this point. Notches 24 are formed in the rim and at least one notch is desired. Preferably, a distributed plurality of notches as shown is employed. The tip of the electrode 3 extends just below the tops or shoulders of the notches 24 when the probe is inserted into and positioned as shown with the tip extending into the liquid which is a level 7. The tip of the probe 3 as it extends into the conductive liquid 26 completes a circuit between the probe 3, liquid 26, and leads or connectors 9 and 10 so that the liquid become part of the circuit. The tapered sheath wall 22 and the notches 24 break up the surface tension of the liquid so that the liquid rises without the creation of bubbles. Air is trapped in the cavity 8 which is air tight when the liquid rises above the top of the notches and the compression of the air in the cavity provides sufficient force to prevent further upward movement of the liquid within the housing 12. Even when the probe is at a depth represented by the liquid level 7' the air remains trapped in cavity 8 so long as the probe maintains its vertical position. Thus, no liquid enters the cavity 8 and the electrode or probe 3 remains isolated from the wall of sheath 12. If the collar 5 does not act as an airtight seal, the liquid will rise and fill the cavity 8 and contact all surfaces therein. The epoxy which fills cavity 4 ensures that an airtight seal is maintained.

In prior designs without the air cavity, after the probe has had contact with the liquid and with the collar 5 the liquid would drain from the cavity but would leave a surface film that would be a conducting or bridging path from the probe across the collar to the housing or sheath. Thus, a complete hermetic seal by the collar aided by the filled cavity 4 above the collar ensure the integrity and air tightness of the cavity 8.

The electrode 3 is preferably formed from a corrosion resistant metal such as 304 stainless steel. The tip of the electrode 3 is tapered so that the liquid will easily drip from it. The essential features of the material of the electrode 3 are, of course, that the electrode be electrically conductive and non-corrosive and is adapted to be connected to leads to a sensing module. The electrode can be of other compatible materials that may be required where the liquid is acidic, basic, or has other properties that necessitate an appropriate choice of sheath material.

The sheath or housing is preferably made of schedule 10 stainless steel. In addition to the reason mentioned above for the sheath being tapered inwardly at its lower end or rim, another reason is to prevent ingestion of debris encountered during the deployment of the detector by "wedging" debris away as the tapered rim encounters the liquid surface. Also, based on observations and experimental data, when the detector is immersed in a liquid, the tapered edge penetrates a smaller portion of the liquid surface so that the effect of the surface tension of the liquid is reduced consequently reducing the tendency to form bubbles on the face of the sheath that can produce an unwanted electrical path between the electrode and the sheath. Furthermore, by adding notches 24 in the end or rim 23 of the sheath 12 the bubble problem is eliminated. The detector must be vertically installed.

The insulating collar 5 provides several functions as mentioned above. It keeps the electrode 3 electrically isolated from the sheath and in a second embodiment that employs a second electrode as described below the collar separates the electrodes one from the other and secures the electrode or electrodes within the sheath so that epoxy may be poured into the sheath. The epoxy is retained while it is cured. As mentioned above the epoxy that fills the cavity 4 preferably to the top of the detector assembly acts as insulation to prevent any electrical bridging of the parts.

Figure 2:
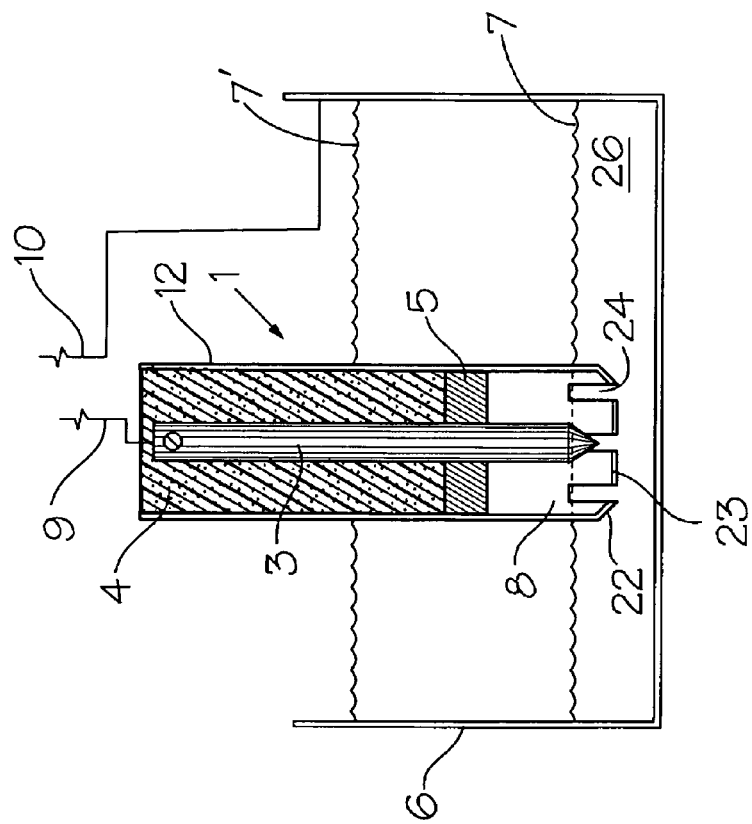
FIG. 2 is a schematic elevation view of a dual electrode liquid level detector according to the present invention in which the electrodes are positioned in a non-metallic tank; and, FIG. 3 is a schematic side view of one embodiment of a probe according to the present invention.

Looking now at FIG. 2, a second preferred embodiment shows liquid level detector 11 that is a dual electrode detector having a first electrode 13 and a second electrode 14 disposed within sheath 12. These two probes or electrodes are primarily held by non-conductive or insulating collar 16 and are held in place by epoxy which fills cavity 15. In the embodiment as shown in FIG. 2, the container or tank 17 for the liquid 26 is a non-metallic or non-conductive tank. The dual electrodes and conductive liquid provide the pathway for a circuit between them.

The liquid level is shown at level 18 which is the level inside and outside of the sheath 12. The liquid remains at level 18 inside the sheath even though outside the sheath it may rise to level 18'. As previously described, notches 24 are provided in the wall of the sheath 12 and, when the detector 11 is vertically installed and liquid is at the level 18, an airtight cavity 21 is formed. The airtight cavity 21 retains its integrity as long as the detector remains vertical. It can be understood that the detectors of this invention can perform in two ways. In the embodiment of FIG. 2 when an electrical pathway is formed between the two electrodes with their respective tips in the conductive liquid, the circuit is completed through a sensor or sensing module that is connected to electrical leads 19 and 20 that are attached to the upper ends of the respective electrodes. When the liquid level drops from the level 18 and below so that the tips of the electrodes 13 and 14 do not contact the liquid, the circuit is broken and an alarm sounds to alert an operator that liquid is leaking from the tank. In this regard, the detector 11 is acting as a leak detector. On the other hand, when the liquid level is below the tips of the probes, and it rises upon filling the tank, a signal will be sent as soon as the liquid rises to the point where the tips of both probes are in contact with the liquid. In this position, the detector acts as a fill indicator.

Figure 3:
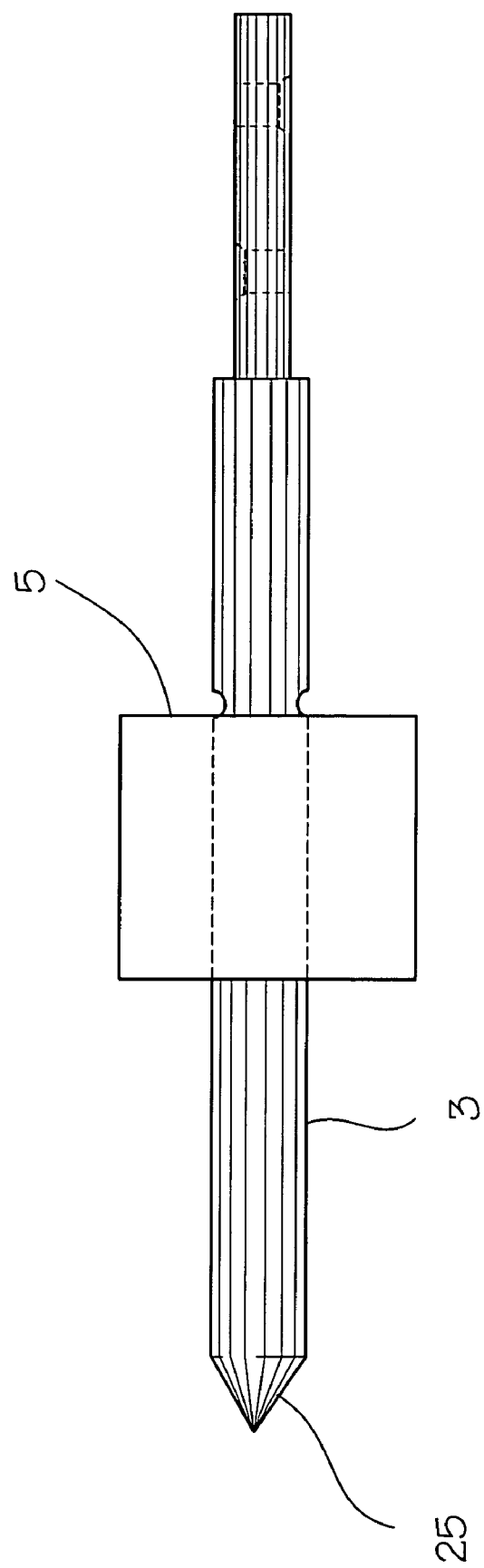

Turning now to FIG. 3, a side view of a preferred probe 3 is shown. In this embodiment the collar 5 is preferably formed from either polypropylene or fiberglass and the probe is formed from 304 stainless steel. In a present best mode embodiment the probe will have a length of about 4½ inches and have a diameter of about ¼ inch. The beveled or tapered surface 25 is at about a 45' angle. The sheath is about 5¾ inches in this embodiment and is installed vertically as shown in FIG. 1 described above. As mentioned, the materials and size of the probe are application specific and may vary over a wide range of dimensions. One critical parameter, however, is the relative size of the air chamber or cavity 8 and cavity 21. The position of the tip of the probe must be above the end of the sheath and below the shoulders of the notches; and, the air chamber must have enough vertical height to keep the liquid from filling the chamber under high pressure conditions, for example, when the probe is positioned at a depth that is significantly below the level of the liquid. In the best mode the distance from the lower end of sealing and insulating collar 5 to the tip of the probe as shown in FIG. 1 is about 1.75", the sheath has an inner diameter of about 0.88", the height of the notches from sheath rim to notch shoulder is about 0.375" and the bevel or taper at the lower end of the sheath above the rim is at 45'. Again, as mentioned, the tip of the probe should be between the shoulder or top of the notch and the end of the sheath. The initial vertical height of the air cavity is of the order of 1.375" in this embodiment but may be at any predetermined vertical distance or height within the limitation set forth herein. If the tip of the probe does not extend to a point lower than the shoulder of the notch, the probe would not alarm even if the detector were immersed in liquid because the trapped air would prevent contact between the probe and liquid. On the other hand, if the tip of the probe were to extend past the end of the sheath, the probe would be unprotected and would possibly alarm by coming in contact with conductive floating debris.

Having described preferred embodiments of the present invention, it should now be apparent to those skilled in the art that numerous other embodiments and modifications thereof are contemplated as falling within the scope of the present invention as defined by the appended claims.

What is claimed is:

1. A liquid level detector for use in containers of electrically conductive liquids wherein said detector is installed vertically comprising:

a) a sheath having an open lower end defined by a rim for contacting a liquid;
b) at least one vertically extending notch in said rim; said notch terminating in a shoulder at an upper end;
c) an electrically conductive probe positioned within said sheath and spaced apart therefrom, said probe having a tip positioned vertically between said rim and the shoulder of said notch, wherein said tip of said probe is located at an end of said probe and is tapered to a point so as to be conical in shape, wherein the point of said tip is positioned vertically between said rim and the shoulder of said notch;
d) an insulating seal between said probe and said sheath hermetically sealing the sheath at a predetermined distance vertically above the tip of said probe, said seal holding and positioning said probe within said sheath, wherein said sheath from said shoulder of said notch in said rim to said insulating seal is liquid tight such that liquid is not capable of being transferred through an outer wall of said sheath at any point between said shoulder of said notch in said rim and said insulating seal, wherein said insulating seal contacts said probe at a point of contact and a bottom surface of said insulating seal extends from said probe to an inner wall of said sheath, wherein said bottom surface of said insulating seal, said inner wall of said sheath from said shoulder of said notch to said bottom surface of said insulating seal, and said probe from said bottom surface of said insulating seal to said shoulder of said notch define a cavity into which air is trapped that prevents the liquid from contacting said bottom surface of said insulating seal, wherein said probe from said point of contact with said insulating seal at said bottom surface of said insulating seal to said shoulder of said notch that defines said cavity directly faces said inner wall of said sheath from said shoulder of said notch to said point of contact with said insulating seal at said bottom surface of said insulating seal;
e) a first electrical conductor connected to the upper end of said probe and a second electrical conductor for electrically establishing a conductive path with a liquid into which said probe may be inserted, each of said conductors being adapted to be connected to a module for sensing a complete circuit between the probe and liquid;
f) epoxy located within said sheath that contacts said inner wall of said sheath, said probe, and an upper surface of said insulating seal, wherein said insulating seal is penetrated only by a portion of the complete circuit.

2. The detector of claim 1 including an additional probe so that two probes are positioned within said sheath, the probe of claim 1 being designated as the first probe and the additional probe being designated as the second probe, a tip of said second probe being positioned at the same vertical height as said tip of the first probe, the second probe being insulated from the first probe and from the sheath wall by the insulating seal; and the second conductor being connected to said second probe, to establish a conductive path between the second probe and the sensing module when a liquid contacts the first and second probes.

3. The detector of claim 1 wherein a plurality of notches are positioned equidistant around said rim.

4. The detector of claim 3 wherein the outer wall of the sheath immediately above said rim tapers inwardly and terminates in said rim.

5. In the method of determining liquid level in a tank by using a vertically installed liquid level detector, said detector including a probe having a tip at a lower end located within a sheath having an upper end and a lower end, said lower end terminating in a rim, said probe being electrically insulated from said sheath, the improvement comprising the steps of:
a) providing a series of notches around said rim, said notches having an open lower end and the upper end terminating in a shoulder;
b) positioning the tip of the probe so that the tip is below said shoulder and above said rim, wherein the tip of the probe is located at an end of the probe and is tapered to a point so as to be conical in shape, wherein the point of the tip is positioned above said rim and below said shoulders of said notches;
c) providing an insulating, hermetic seal between the sheath wall and the probe, said seal being spaced apart from and above said shoulder a pre-determined distance sufficient to create an air cavity whereby when the level of liquid within the tank contacts said probe and rises above said shoulder further upward movement of liquid within the sheath will be prevented by the compression of air within said cavity consequently preventing liquid contact with said seal, wherein said insulating seal contacts said probe at a point of contact and a bottom surface of said insulating seal extends from said probe to an inner wall of said sheath, wherein said bottom surface of said insulating seal, said inner wall of said sheath from said shoulder of said notches to said bottom surface of said insulating seal, and said probe from said bottom surface of said insulating seal to said shoulder of said notches define said air cavity into which air is trapped that prevents the liquid from contacting said bottom surface of said insulating seal, wherein said probe from said point of contact with said insulating seal at said bottom surface of said insulating seal to said shoulder of said notches that defines said air cavity directly faces said inner wall of said sheath from said shoulder of said notches to said point of contact with said insulating seal at said bottom surface of said insulating seal, wherein epoxy is located within said sheath that contacts said inner wall of said sheath, said probe, and an upper surface of said insulating seal, wherein said insulating seal is penetrated only by a portion of a complete circuit that is used to determine the liquid level in the tank;

wherein said sheath from said shoulder to said seal is liquid tight such that liquid is not capable of being transferred through said sheath wall at any point between said shoulder and said seal.

6. The method of claim 5 including the step of providing a tapered sheath wall immediately above said rim.

* * * * *